Patented Nov. 24, 1953

2,660,574

UNITED STATES PATENT OFFICE 2,660,574

PROCESS FOR THE PRODUCTION OF POLYURETHANES

Wilford Donald Jones and Samuel B. McFarlane, Summit, N. J., assignors to Celanese Corporation of America, New York, N. Y., a corporation of Delaware No Drawing. Application August 4, 1950, Serial No. 177,763

29 Claims. (Cl. 260—77.5)

This invention relates to a process for the production of polymers and relates more particularly to an improved polymerization process for the production of long chain high molecular weight polyurethanes.

This application is a continuation-in-part of U. S. application S. No. 117,712 filed September 24, 1949 now abandoned.

An object of this invention is to provide an improved process for effecting a condensation polymerization involving the reaction of a diamine and a bis-chloroformate whereby polyurethanes may be obtained in high yield.

Another object of this invention is the production of polyurethanes of high molecular weight and relatively high intrinsic viscosity, by a suitable intercondensation polymerization reaction, which are adapted to be employed commercially for the production of molded materials, yarns, filaments and the like by suitable shaping operations.

Yet another object of this invention is the production of polyurethane interpolymers by reacting two or more diamines with one or more bis-chloroformates so as to form polyurethanes containing units of varying chain length and structure between the polyurethane linkages.

A further object of this invention is the production of pigmented polyurethanes by a condensation polymerization wherein the desired pigment is introduced during the interpolymerization reaction and intimately dispersed within the polymer as it is formed.

Other objects of this invention will appear from the following detailed description.

Polymeric urethanes are long-chain linear thermoplastic polymeric materials and may be shaped under the action of heat and pressure to produce molded articles. When molten, the polymeric urethanes may be spun into filaments and yarns of any desired denier. Long-chain polyurethanes may be formed by reacting a diisocyanate with a glycol, by reacting a bis-chloroformate with a diamine, by reacting a phenol carbonic ester with a diamine and a glycol, by reacting a bis-carbamic ester of a diamine with a glycol, or by condensing a bifunctional compound such as an amino-alcohol chloroformate so as to form a long-chain linear compound.

The bis-chloroformate-diamine method of producing polyurethanes may be effected by dissolving the bis-chloroformate in benzene, adding water to the said benzene solution, bringing the same into a fine dispersion or suspension by stirring rapidly and then adding said dispersion or suspension to an aqueous solution of diamine and sodium hydroxide whereby the polymer is precipitated in the form of fine particles. This method of producing polyurethanes is, however, not entirely satisfactory since the yields of polymer obtained are quite limited and the molecular weight of the polymer so produced is too low for satisfactory commercial use.

We have now found that if a diamine and a bis-chloroformate are reacted in accordance with the novel process of our invention a high yield of polyurethanes of satisfactory molecular weight and color and entirely suitable for a wide range of industrial applications may be readily obtained. In accordance with our process, the diamine is mixed with the bis-chloroformate at a pH below about 7, or preferably below about 6, at which pH substantially no polymerization will take place. The polymerization is then effected by raising the pH of the mixture to above about 8, or preferably to between about 10 and 12, by the addition of an alkaline material thereto.

Advantageously, the novel process of our invention is carried out by forming an aqueous solution of the diamine together with sufficient acid to bring the pH to the desired value. The diamine probably reacts with the acid to form an acid salt. Alternatively, the diamine may be employed as the acid salt, in which case the solution may have the desired pH without the addition of further quantities of acid thereto. As suitable acids for lowering the pH of the solution or for forming the diamine acid salt there may be mentioned hydrochloric acid, sulfuric acid, phosphoric acid, acetic acid, formic acid, benzene sulfonic acid, alkyl benzene sulfonic acid, or mixtures thereof, or the like. The term "acid salt" is employed herein to designate a salt which gives an acid reaction. To the diamine solution is added the bis-chloroformate, preferably in the form of a solution in an organic solvent as, for example, an aromatic solvent such as benzene, toluene, xylene, or the like, or other non-hydroxylated organic solvent such as chloroform, carbon tetrachloride, or other chlorinated aliphatic or aromatic hydrocarbon, octane, naphthene, or a petroleum fraction, or mixtures thereof. Water-miscible organic solvents such as acetone, dioxane, methyl ethyl ketone or other ketone or ether, or mixtures thereof, may also be used, but are somewhat less desirable, since on adding a solution of the bis-chloroformate in a water-miscible solvent to the aqueous diamine solution, the solvent will immediately go into the water phase, thereby precipitating the bischloroformate to form a dispersion. Aromatic solvents are preferred for forming the bis-chloroformate solution as they yield polymers of more desirable molecular weight. The mixture of the aqueous diamine solution and the bis-chloroformate is dispersed by stirring preferably with the aid of a dispersing agent. The polymerization reaction is then caused to take place by adding an aqueous solution of an alkaline material to the dispersion over a period of time with agitation. Suitable alkaline materials are the soluble alkali metal or alkaline earth metal hydroxides, oxides or carbonates. The alkaline materials should be free from groups, such as amino groups having a free hydrogen attached thereto, which will react with the diamine or the bis-chloroformate and function as chain stoppers to limit the molecular weight of the polymer, i. e., which would react with the bis-chloroformate to form a nitrogen to carbon linkage. Examples of suitable alkaline materials are sodium hydroxide, potassium hydroxide, barium hydroxide, sodium carbonate, or trisodium phosphate, quaternary ammonium bases containing no free amino groups and the like. The alkaline material employed should be one which enables a pH of above about 8 to 12 to be obtained. The addition of the alkaline material, raises the pH of the dispersion, neutralizes the acid salt of the diamine, frees the diamine and enables it to react with the bis-chloroformate. The polymer formed precipitates from the dispersion in the form of solid finely-divided particles as the polymerization reaction proceeds. When the pH of the dispersion has been raised to the desired value and the reaction is completed, agitation is halted, the phases allowed to separate and the precipitated polyurethane is filtered out. Reaction temperatures of from about −20 to 30° C. may be employed. The lower temperatures may be achieved with the use of anti-freeze agents such as ethylene glycol, glycerine or methanol in the dispersion. Although hydroxylated solvents are not suitable for preparing the bis-chloroformate solution, as pointed out above, they may nevertheless be employed as anti-freeze agents without undesirable effects since they will not react with the bis-chloroformate or become chain stoppers in the concentrations necessary for this purpose and at the low temperature employed and during the short time of the polymerization. Most advantageously, the temperature during mixing, dispersion and polymerization is maintained at from about −2 to about 5° C. to achieve maximum molecular weight.

In contrast to the experience normally encountered in the formation of linear polymers by the reaction of bifunctional organic compounds, when polymerization is effected between a bis-chloroformate and a diamine, an excess of either reactant, the diamine or the bis-chloroformate, in the reaction mixture does not act to limit chain length. Accordingly, since the molecular ratio of the reactants has no effect upon the molecular weight of the polymers obtained, any desired molecular ratio may be employed. However, a marked molecular excess of one reactant over the other creates a recovery problem due to the presence of the unreacted intermediate. Accordingly, it is most advantageous to react the diamine and bis-chloroformate in substantially equimolecular ratio.

While the ratio of the water to organ solvent employed in our novel polymerization process does not have any markedly undesirable effect upon the yield of polymer obtained, we have found that for the production of polymers of optimum molecular weight this ratio should be adjusted within certain limits. Thus, for each volume of water employed from about 0.6 to about 1.2 volumes of organic solvent is preferred. Higher ratios of organic solvent do not produce polymers of markedly higher molecular weight.

The concentration of the diamine in the aqueous solution and the concentration of the bis-chloroformate in the solvent solution, on the other hand, does affect the yields obtained without, however, greatly affecting the molecular weight of the polymers. The higher the molar concentration of the solutions employed in our novel polymerization process, the higher is the yield obtained. Thus, in the case of a dispersion containing water and aromatic solvent in a given volumetric ratio, we have found that by increasing the molar concentration of the reactants from about 0.11 to about 0.35 mols per liter of solvent, for example, the yield is found to have increased by about 8%. Preferably, we employ molar concentrations of from 0.1 to 1.0 mols per liter of solvent or even as high as 5.0 mols per liter when proper agitation may be attained. A molar concentration of less than about 0.1 mols per liter is undesirable economically as such a degree of dilution requires the handling of a large bulk of solution with a relatively small amount of product being produced. However, the use of such dilute solutions in effecting the condensation reaction does yield polymers of a desirably high molecular weight. As stated above, however, the reactants need not be present in equimolecular ratio but the amount of solvent employed in forming the dispersion should be within the ratios indicated above, relative to the water.

Numerous dispersing agents may be satisfactorily employed in our novel polymerization process to produce the desired dispersion of the aqueous solution of diamine and the organic solvent solution of the bis-chloroformate. Dispersing agents of the anionic and non-ionic type are quite satisfactory although it is important that they do not contain free amino groups since a free amino group would be reactive in the condensation reaction and act as a chain stopper. Examples of suitable dispersing agents are long chain alcohol sulfates, such as sodium lauryl sulfate or sodium oleyl sulfate, ethylene oxide condensates with long chain fatty alcohols, esters of sodium sulfosuccinic acid, such as the dioctyl ester, long chain fatty acid esters of polyethylene glycol, ethylene oxide condensates with castor oil, long chain monoglycerides, alkyl aryl polyether alcohols, i. e. the reaction product of ethylene oxide and xylenol, sorbitan monolaurate, the condensation product of sorbitan monolaurate with ethylene oxide, mono- or poly-alkyl naphthalene sulfonates, sulfates of fatty acid monoglycerides or the glycol esters of long chain fatty acids. It is important, for the production of polymers of good color, that the dispersing agent be as free as possible of colored bodies as the polymer tends to scavenge colored bodies from the dispersing agent and the reaction mixture. The most advantageous results are obtained, however, employing dispersing agents comprising the sodium salt of an N-substituted amino-ethane-sulfonic acid, i. e. an N-substituted taurine. The substituents on the nitrogen may include both alkyl groups such as methyl, ethyl, propyl, butyl, amyl, hexyl, heptyl, octyl, decyl, undecyl, dodecyl, etc. and acidyl groups. The acidyl group, when present, is preferably the acidyl group of a long chain saturated or unsaturated aliphatic acid containing six to eighteen carbon atoms. Examples of said acids are lauric, oleic, ricinoleic, lineoleic, caproic, pimelic, heptylic, undecylic and stearic acid, for example. Optimum results are achieved employing the sodium salt of N-butyl. N-lauroyl-β-amino-ethane sulfonic acid as the dispersing agent. The amount of dispersing agent employed is preferably from 0.02 to 0.04 mol for each mol of the diamine or bis-chloroformate undergoing reaction.

Examples of diamines which may be employed in forming polyurethanes in accordance with the novel polymerization process of our invention are ethylene diamine, trimethylene diamine, tetramethylene diamine, pentamethylene diamine, hexamethylene diamine, ortho-, meta- or para-phenylene diamine, cyclohexylene diamine and nuclearly substituted-phenylene diamines and nuclearly substituted-cyclohexylene diamines. N-substituted diamines which contain a free amino hydrogen on each amino group are also suitable.

Other diamines which may also be employed are, for example, α,ω-di-(3-aminopropoxy)-alkanes, such as 1,4-di-(3-aminopropoxy)-butane, bis-(ω-amino-alkyl) ethers such as 3,3'-diamino-di-propylether, 4,4'-diamino-dicyclohexyl methane, bis-(ω-amino-alkyl) sulfides such as 2,2'-diamino-di-ethyl-sulfide, 1,2-, 1,3-, or 1,4-α,α'-diamino xylene or other ω,ω'diamino dialkyl benzene, diamino-naphthalene, diamino-biphenyl, ω,ω'-diamino-dialkyl biphenyls, ω-amino-alkyl anilines, ω-amino-alkyl cyclohexylamines, bis-(ω-amino-alkoxy) - benzene, bis - (ω - amino-alkoxy) -cyclohexane; 4,4' - diamino - dicyclohexyl sulfones, ω,ω'-sulfonyl-bis-alkyl amines, diamino-diphenyl sulfones, diamino-benzophenones and N,N' - bis - (ω - amino - alkyl) - α,ω - alkane disulfonamides. Amines containing more than two reactive amino groups, either primary or secondary, such as diethylene triamine or triethylene tetramine, for example, yield branch chain polyurethanes. Such polymers, if they contain moderately branched chains, are of relatively low melting point. If the chains are highly branched the polymers approach and may even reach substantial infusibility.

The bis-chloroformates which are reacted with the above mentioned diamines may be obtained by reacting phosgene, i. e. carbonyl chloride, with a diol. The bis-chloroformates of diols such as ethylene glycol, trimethylene glycol and 1,4-butanediol, for example, are suitable. Higher glycols wherein the alkylene chain contains a greater number of carbon atoms and may be a straight chain or a branched chain are also satisfactory. Examples of other diols whose bis-chloroformates may be employed are ω,ω'-dihydroxy-dialkyl ethers, ω,ω'-dihydroxy-dialkyl thioethers, bis-glycol or diglycol esters of straight chain or branched chain aliphatic dicarboxylic acids such as the bis-ethylene glycol ester of succinic acid, the bis-diethylene glycol ester of succinic acid, the bis-ethylene glycol ester of glutaric acid, the bis-ethylene glycol ester of adipic acid, the bis-ethylene glycol ester of pimelic acid, the bis-ethylene glycol ester of suberic acid, azelaic acid or sebacic acid, the diol, dimer or trimer esters obtained by the conversion of an excess of an aliphatic glycol with a dicarboxylic acid of the several aliphatic dicarboxylic acids mentioned above, ω,ω'-di-hydroxy dialkyl ethers of hydroquinone, ω,ω'-dihydroxy dialkyl ethers of dihydroxy-cyclohexane, ω,ω'-sulfonyl bis-alkanols, i. e. bis-(ω-hydroxyalkyl-sulfones), N, N'-(ω-hydroxy-alkyl)-dicarboxyamides such as N,N'-(β,β'-di-hydroxy-diethyl)-adipamide, cycloaliphatic glycols as cyclohexylene glycol, dihydroxy tetrahydrofurane, hydroxy-hydroxymethyl furane, hydroxy-hydroxymethyl-tetrahydrofurane, and di-hydroxy-oxathiane dioxide.

Thus, the polyurethane may contain an alkylene linkage of two, three, four, five or more carbon atoms alternating with an alkylene linkage of two, three, four, five or more carbon atoms. For ready identification, the alkylene polyurethanes may be identified as 2,4-, 3,4-, 4,4-, 5,6-, 6,6-, or other polyurethane, the former numeral referring to the carbon chain length of the diamine employed while the latter refers to the carbon chain length of the bis-chloroformate. Mixed polyurethanes containing any type of intermediate linkage or grouping as brought out above may also be formed by employing any of the diamines and bis-chloroformate of the diols mentioned or a mixture of two or more different diamines or two or more different bis-chloroformates.

In order further to illustrate our invention, but without being limited thereto, the following examples are given:

*Example I*

1580 parts by weight of water and 49.3 parts by weight of tetramethylene diamine are charged into a jacketed reaction vessel and the amine neutralized to Congo red paper (pH 3–5) by the addition of hydrochloric acid thereto. 960 parts by weight of toluene are added to the neutralized amine solution and the whole cooled to 0° C. by circulating cold brine through the jacket. The resulting mixture is maintained under constant, strong agitation. A mixture of 121 parts by weight of 1,4-butanediol bis-chloroformate, 7 parts by weight of N-butyl, N- lauroyl-β-amino-ethane sodium sulfonate and 30 parts by weight of water is then added to the original cooled mixture and with strong agitation the mixture is converted to a mobile, white dispersion. While the dispersion is being strongly agitated, a solution of 90 parts by weight of sodium hydroxide in 700 parts by weight of water is added slowly over the course of one hour bringing the pH to between 10 and 12. Upon the addition of the sodium hydroxide the desired polymerization takes place immediately with the formation of a linear polyurethane which precipitates in the form of a fine, insoluble white powder. After the sodium hydroxide addition is completed, stirring is continued for an additional period of 15 minutes and the phases then allowed to separate by allowing the mixture to stand. The polyurethane precipitate is filtered off, washed with hot water at 50° C., washed with isopropyl alcohol, filtered and then dried by flowing clean filtered air through the press cake. The polyurethane is obtained in a yield of 86.5% of theoretical and the product has an intrinsic viscosity of 0.78. The polymer may be melt spun into excellent filaments.

The intrinsic viscosity is determined by dissolving 0.4 grams of the polymer in purified meta-cresol to a total volume of 100 milliliters and determining the relative viscosity at 25° C. The relative viscosity, $\eta r$, is substituted in the Baker-Phillippoff expression for intrinsic viscosity $$[\eta] = \frac{\eta r^{0.38} - 1}{0.38 - 0.4}$$

the intrinsic viscosity being $[\eta]$.

*Example II*

A solution of 70.5 parts of tetramethylene diamine (99.8% purity by alkalinity) is formed in 7000 parts of water. The solution is brought exactly to the Congo red end point (pH 3-5) by addition of about 155 parts by weight of concentrated HCl (sp. gr. 1.19). This solution is charged to a reactor. A solution of 172 parts by weight of 1,4-butane-diol bis-chloroformate (98.8% by analysis) is formed in 4100 parts by weight of toluene and charged to the reactor together with 20 parts of 30% aqueous solution of sodium lauryl sulfate in 500 parts of water. The whole is stirred at high speed and then cooled to −1° C. A solution of 128 parts of sodium hydroxide in 1000 parts of water is added dropwise over 37 min. while the temperature is maintained between 1 and 2° C. The pH remains between 7 and 8 during the bulk of this addition and rises finally to between 10 and 12. In spite of a higher polymer concentration, the mixture is easily stirred. The product is isolated and dried. The yield is 144 parts or 81% of theory, having an intrinsic viscosity of 0.76. This polymer melts at 200 to 206° C., and excellent fibers possessing 300-400% cold draw can be drawn from the melt.

*Example III*

52.8 parts by weight of tetramethylene diamine of 99.91% purity are added to 1750 parts by weight of water and the mixture neutralized to Congo red paper (pH 3-5) by the addition of concentrated hydrochloric acid thereto. The solution obtained is cooled to 0-5° C. with stirring and a solution of 129.0 parts by weight of 1,4 - butanediol-bis-chloroformate of 98.95% purity in 1075 parts by weight of toluene added with the stirring being continued. To the cool mixture obtained is added a solution of 15 parts by weight of 27% aqueous N-butyl-N-lauroyl-β-amino-ethane sodium sulfonate in 50 parts by weight of water. On continued stirring the reaction mixture is converted into a white, stable dispersion. A solution of 96 parts by weight of sodium hydroxide in 650 parts by weight of water is then slowly added to the dispersion with stirring over the course of about 1¼ hours bringing the pH to between 10 and 12. With the addition of the sodium hydroxide, reaction takes place and the polyurethane polymer forms and precipitates from the dispersion as a fine, white powder. Stirring is continued for about 10 minutes and the phases of the dispersion then allowed to separate on standing. The polyurethane polymer is filtered off and washed by sludging in acetone, the acetone wash being followed by a water wash. The product is again filtered and then dried with air at 105° C. The yield of 4,4-polyurethane polymer obtained is 93% of theory, the latter having an intrinsic viscosity of 1.1.

Polyurethane polymers in any desired color may be readily obtained by incorporating a finely-divided pigment in the dispersion during polymerization. Pigments such as titanium dioxide, Bengal Toner, Opaline Green and Franconia Blue give excellent results, the pigment being uniformly dispersed throughout the particles of polymer.

*Example IV*

52.8 parts by weight of tetramethylene diamine (100% purity) are added to 1750 parts by weight of water and the mixture neutralized to Congo red paper (pH 3-5) by the addition of concentrated hydrochloric acid thereto. The solution is cooled to 0 to 5° C. with stirring and a solution of 129.0 parts by weight of 1,4-butanediol-bis-chloroformate (99% purity) in 1075 parts by weight of toluene added with continued stirring. 30 parts by weight of titanium dioxide in 300 parts by weight of water are ball milled for 24 hours together with 2 parts of a 27% solution of N-butyl-N-lauroyl-β-amino-ethane sodium sulfonate and 1.6 parts by weight of this dispersion are added to the mixture of tetramethylene diamine and 1,4-butanediol-bis-chloroformate. A solution of 15 parts by weight of 27% aqueous N-butyl-N-lauroyl-β-amino-ethane sodium sulfonate in 50 parts by weight of water is then added and further stirring yields a stable, white dispersion. A solution of 96 parts by weight of sodium hydroxide in 650 parts by weight of water is then slowly added to the dispersion with stirring over about 1¼ hours bringing the pH to between 10 and 12. Reaction takes place with the addition of the sodium hydroxide and the polyurethane polymer which forms precipitates as a fine white powder with the white pigment evenly and uniformly dispersed throughout in fine particle size and in an unagglomerated form. The polymer is obtained in a 91% yield with an intrinsic viscosity of 1.06. Yarn melt spun from this polymer exhibits an even cold draw and possesses excellent tenacity.

When the same procedure is followed except for the addition of 30 parts by weight of a 0.04% milled aqueous dispersion of Franconia Blue in lieu of the titanium dioxide, a blue pigmented polymer is obtained which is stable during melt spinning and yields evenly colored molded products at 196° C. under a pressure of 5000 pounds per square inch.

*Example V*

A solution of 4.4 parts by weight of tetramethylene diamine (100%) purity and 11.7 parts by weight of ethylene diamine (hydrate) is formed in 1750 parts by weight of water and the solution neutralized to the Congo red end point (pH 3-5) by the addition thereto of 39 parts by weight of concentrated hydrochloric acid (sp. gr. 1.19). The solution is cooled to 0° C. and 15 parts of a 30% solution of sodium lauroyl sulfate in 50 parts by weight of water is added followed by the addition of 43 parts by weight of 99.8% 1,4-butanediol-bis-chloroformate in 1100 parts by weight of toluene. The whole mixture is stirred rapidly at 0 to 2° C. while a solution of 32 parts of sodium hydroxide in 250 parts of water is added over 30 minutes bringing the pH to between 10 and 12. Stirring is continued for 15 minutes longer and the polymer formed is isolated, washed by sludging with water and acetone alternately and then dried. The yield is 85% of theory of a polymer melting at 205 to 207° C. and having an intrinsic viscosity of 1.31.

*Example VI*

A solution of 15.6 parts by weight of ethylene diamine (76.7% purity) in 1750 parts by weight of water is neutralized to the Congo red point (pH 3-5) with about 39 parts of concentrated hydrochloric acid (sp. gr. 1.19) and then cooled to 0° C. A solution of 43 parts by weight of 99.3% 1,4-butanediol bischloroformate in 1075 parts by weight of toluene is added followed by 15 parts of 30% sodium oleyl sulfate in 50 parts of water and the whole stirred at −1 to 0° C. while 32 parts by weight of sodium hydroxide in 250 parts by weight of water is dropped in over 20 minutes bringing the pH to between 10 and 12. The polymer formed is separated, washed several times with water and acetone alternately and then dried. A yield of 87% of theory is obtained of 2,4-polyurethane melting at 220 to 223° C. and having an intrinsic viscosity of 1.1.

*Example VII*

A solution of 17.6 parts by weight of tetramethylene diamine (99.9% purity) is formed in 1750 parts by weight of water and the solution neutralized to the Congo red end point (pH 3–5) by the addition thereto of 33.5 parts by weight of concentrated hydrochloric acid (sp. gr. 1.19). The solution is cooled to 5° C. and 43.4 parts by weight of 1,4-butanediol-bis-chloroformate in 870 parts by weight of toluene is added and the mixture cooled to 0–3° C., followed by the addition of 10 parts by weight of 27% aqueous N-lauroyl-N-butyl-β-amino ethane sodium sulfonate in 50 parts by weight of water. The whole mixture is stirred rapidly at 0° C. while a solution of 32 parts by weight of sodium hydroxide in 250 parts by weight of water is added over 20 minutes, with the pH remaining about 8 until 80–90% of the sodium hydroxide solution is added when the pH rises rapidly to above 10. Stirring is continued for 15 minuts longer and the polymer formed is filtered, washed by sludging alternately with water and toluene and then dried. The yield is 83.4% of theory of a polymer having an intrinsic viscosity of 1.19.

*Example VIII*

A solution of 17.6 parts by weight of tetramethylene diamine (99.9% purity) is formed in 1750 parts by weight of water and the solution neutralized to the Congo red end point (pH 3–5) by the addition thereto of 24 parts by weight of acetic acid. The solution is cooled to 5° C. and 43.4 parts by weight of 1,4-butanediol-bis-chloroformate in 870 parts by weight of toluene is added and the mixture cooled to 0–3° C., followed by the addition of 10 parts by weight of 27% aqueous N-lauroyl-N-butyl-β-amino ethane sodium sulfonate in 50 parts by weight of water. The whole mixture is stirred rapidly at 0° C. while a solution of 32 parts by weight of sodium hydroxide in 250 parts by weight of water is added over 20 minutes, with the pH remaining about 8 until 80–90% of the sodium hydroxide solution is added when the pH rises rapidly to above 10. Stirring is continued for 15 minutes longer and the polymer formed is filtered, washed by sludging alternately with water and toluene and then dried. The yield is 82.4% of theory of a polymer having an intrinsic viscosity of 1.02.

*Example IX*

A solution of 17.6 parts by weight of tetramethylene diamine (99.9% purity) is formed in 1750 parts by weight of water and the solution neutralized to the Congo red end point (pH 3–5) by the addition thereto of 46 parts by weight of phosphoric acid in the form of an 85% by weight aqueous solution. The solution is cooled to 5° C. and 43.4 parts by weight of 1,4-butane-diol-bis-chloroformate in 870 parts by weight of toluene is added and the mixture cooled to 0–3° C., followed by the addition of 10 parts by weight of 27% aqueous N-lauroyl-N-butyl-β-amino ethane sodium sulfonate in 50 parts by weight of water. The whole mixture is stirred rapidly at 0° C. while a solution of 48 parts by weight of sodium hydroxide in 375 parts by weight of water is added over 35 minutes, with the pH remaining about 8 until 80–90% of the sodium hydroxide solution is added when the pH rises rapidly to above 10. Stirring is continued for 15 minutes longer and the polymer formed is filtered, washed by sludging alternately with water and toluene and then dried. The yield is 79.1% of theory of a polymer having an intrinsic viscosity of 0.96.

It is to be understood that the foregoing detailed description is given merely by way of illustration and that many variations may be made therein without departing from the spirit of our invention.

Having described our invention, what we desire to secure by Letters Patent is:

1. Process for the production of polyurethanes, which comprises forming a mixture whose aqueous solution would have an initial pH below 7 and containing at least one organic diamine free from reactive groups other than amino groups and having at least one hydrogen atom attached to each nitrogen atom and at least one organic bis-chloroformate free from reactive groups other than chloroformate groups, and adding an alkaline material incapable of reacting with the bis-chloroformate to form a nitrogen to carbon linkage to the mixture in an amount sufficient so that its aqueous solution would have a pH above 8 and effect the polymerization of the diamine and bis-chloroformate.

2. Process for the production of polyurethanes, which comprises forming a mixture whose aqueous solution would have an initial pH below 7 and containing at least one organic diamine free from reactive groups other than amino groups and having at least one hydrogen atom attached to each nitrogen atom and at least one organic bis-chloroformate free from reactive groups other than chloroformate groups, and raising the alkalinity of the mixture so that its aqueous solution would have a pH above 8 to effect the polymerization of the diamine and bis-chloroformate.

3. Process for the production of polyurethanes, which comprises forming a mixture whose aqueous solution would have an initial pH below 7 and containing at least one organic diamine free from reactive groups other than amino groups and having at least one hydrogen atom attached to each nitrogen atom and at least one organic bis-chloroformate free from reactive groups other than chloroformate groups, and raising the alkalinity of the mixture so that its aqueous solution would have a pH between 10 and 12 to effect the polymerization of the diamine and bis-chloroformate.

4. Process for the production of polyurethanes, which comprises forming a mixture whose aqueous solution would have an initial pH below 7 and containing at least one organic diamine acid salt free from reactive groups other than amino groups and having at least one hydrogen atom attached to each nitrogen atom and at least one organic bis-chloroformate free from reactive groups other than chloroformate groups, and raising the alkalinity of the mixture so that its aqueous solution would have a pH above 8 to effect the polymerization of the diamine and bis-chloroformate.

5. Process for the production of polyurethanes, which comprises forming a mixture whose aqueous solution would have an initial pH below 7 and containing at least one organic diamine acid salt free from reactive groups other than amino groups and having at least one hydrogen atom attached to each nitrogen atom and at least one organic bis-chloroformate free from reactive groups other than chloroformate groups, and adding an alkaline material incapable of reacting with the bis-chloroformate to form a nitrogen to carbon linkage to the mixture in an amount sufficient so that its aqueous solution would have a pH above 8 and effect the polymerization of the diamine and bis-chloroformate.

6. Process for the production of polyurethanes, which comprises forming a mixture whose aqueous solution would have an initial pH below 7 and containing at least one organic diamine free from reactive groups other than amino groups and having at least one hydrogen atom attached to each nitrogen atom and at least one organic bis-chloroformate free from reactive groups other than chloroformate groups, and adding an alkaline material incapable of reacting with the bis-chloroformate to form a nitrogen to carbon linkage to the mixture in an amount sufficient so that its aqueous solution would have a pH between 10 and 12 to effect the polymerization of the diamine and bis-chloroformate.

7. Process for the production of polyurethanes, which comprises forming a dispersion having an initial pH below 7 and containing at least one organic bis-chloroformate free from reactive groups other than chloroformate groups in an aqueous solution of at least one organic diamine free from reactive groups other than amino groups and having at least one hydrogen atom attached to each nitrogen atom, and adding an alkaline material incapable of reacting with the bis-chloroformate to form a nitrogen to carbon linkage to the dispersion in an amount sufficient to raise the pH of the dispersion above 8 and effect the polymerization of the diamine and bis-chloroformate.

8. Process for the production of polyurethanes, which comprises forming a dispersion having an initial pH below 7 and containing at least one organic bis-chloroformate free from reactive groups other than chloroformate groups in an aqueous solution of at least one organic diamine acid salt free from reactive groups other than amino groups and having at least one hydrogen atom attached to each nitrogen atom, and adding an alkaline material incapable of reacting with the bis-chloroformate to form a nitrogen to carbon linkage to the dispersion in an amount sufficient to raise the pH of the dispersion above 8 and effect the polymerization of the diamine and bis-chloroformate.

9. Process for the production of polyurethanes, which comprises forming a dispersion having an initial pH below 7 and containing at least one aliphatic bis-chloroformate free from reactive groups other than chloroformate groups in an aqueous solution of at least one aliphatic diamine free from reactive groups other than amino groups and having at least one hydrogen atom attached to each nitrogen atom, and adding an alkaline material incapable of reacting with the bis-chloroformate to form a nitrogen to carbon linkage to the dispersion in an amount sufficient to raise the pH of the dispersion above 8 and effect the polymerization of the diamine and bis-chloroformate.

10. Process for the production of polyurethanes, which comprises forming a dispersion having an initial pH below 7 and containing at least one aromatic bis-chloroformate free from reactive groups other than chloroformate groups in an aqueous solution of at least one aromatic diamine free from reactive groups other than amino groups and having at least one hydrogen atom attached to each nitrogen atom, and adding an alkaline material incapable of reacting with the bis-chloroformate to form a nitrogen to carbon linkage to the dispersion in an amount sufficient to raise the pH of the dispersion above 8 and effect the polymerization of the diamine and bis-chloroformate.

11. Process for the production of polyurethanes, which comprises forming a dispersion having an initial pH below 7 and containing an aqueous solution of at least one organic diamine free from reactive groups other than amino groups and having at least one hydrogen atom attached to each nitrogen atom and a solution of at least one organic bis-chloroformate free from reactive groups other than chloroformate groups in an organic solvent, and adding an alkaline material incapable of reacting with the bis-chloroformate to form a nitrogen to carbon linkage to the dispersion in an amount sufficient to raise the pH of the dispersion above 8 and effect the polymerization of the diamine and bis-chloroformate.

12. Process for the production of polyurethanes, which comprises forming a dispersion having an initial pH below 7 and containing an aqueous solution of at least one organic diamine free from reactive groups other than amino groups and having at least one hydrogen atom attached to each nitrogen atom and a solution of at least one organic bis-chloroformate free from reactive groups other than chloroformate groups in an aromatic solvent, and adding an alkaline material incapable of reacting with the bis-chloroformate to form a nitrogen to carbon linkage to the dispersion in an amount sufficient to raise the pH of the dispersion above 8 and effect the polymerization of the diamine and bis-chloroformate.

13. Process for the production of polyurethanes, which comprises forming a dispersion having an initial pH below 6 and containing an aqueous solution containing 0.1 to 5.0 mols per liter of at least one organic diamine free from reactive groups other than amino groups and having at least one hydrogen atom attached to each nitrogen atom and a solution containing 0.1 to 5.0 mols per liter of at least one organic bis-chloroformate free from reactive groups other than chloroformate groups in an organic solvent, and adding an alkaline material incapable of reacting with the bis-chloroformate to form a nitrogen to carbon linkage to the dispersion in an amount sufficient to raise the pH of the dispersion above 8 and effect the polymerization of the diamine and bis-chloroformate.

14. Process for the production of polyurethanes, which comprises forming a dispersion having an initial pH below 6 and containing an aqueous solution containing 0.1 to 5.0 mols per liter of at least one organic diamine free from reactive groups other than amino groups and having at least one hydrogen atom attached to each nitrogen atom and a solution containing 0.1 to 5.0 mols per liter of at least one organic bis-chloroformate free from reactive groups other than chloroformate groups in an organic solvent, said dispersion containing 0.1 to 5.0 volumes of organic solvent for each volume of water present, and adding an alkaline material incapable of reacting with the bis-chloroformate to form a nitrogen to carbon linkage to the dispersion in an amount sufficient to raise the pH of the dispersion above 8 and effect the polymerization of the diamine and bis-chloroformate.

15. Process for the production of polyurethanes, which comprises forming a dispersion having an initial pH below 6 and containing an aqueous solution containing 0.1 to 5.0 mols per liter of at least one organic diamine free from reactive groups other than amino groups and having at least one hydrogen atom attached to each nitrogen atom and a solution containing 0.1 to 5.0 mols per liter of at least one organic bis-chloroformate free from reactive groups other than chloroformate groups in an organic solvent, maintaining said dispersion at a temperature of −20 to 30° C., and adding an alkaline material incapable of reacting with the bis-chloroformate to form a nitrogen to carbon linkage to the dispersion in an amount sufficient to raise the pH of the dispersion above 8 and effect the polymerization of the diamine and bis-chloroformate.

16. Process for the production of polyurethanes, which comprises forming a dispersion having an initial pH below 7 and containing at least one organic bis-chloroformate free from reactive groups other than chloroformate groups in an aqueous solution of at least one organic diamine free from reactive groups other than amino groups and having at least one hydrogen atom attached to each nitrogen atom with the aid of a dispersing agent, and adding an alkaline material incapable of reacting with the bis-chloroformate to form a nitrogen to carbon linkage to the dispersion in an amount sufficient to raise the pH of the dispersion above 8 and effect the polymerization of the diamine and bis-chloroformate.

17. Process for the production of pigmented polyurethanes, which comprises forming a dispersion having an initial pH below 7 and containing a pigment and at least one organic bis-chloroformate free from reactive groups other than chloroformate groups in an aqueous solution of at least one organic diamine free from reactive groups other than amino groups and having at least one hydrogen atom attached to each nitrogen atom, and adding an alkaline material incapable of reacting with the bis-chloroformate to form a nitrogen to carbon linkage to the dispersion in an amount sufficient to raise the pH of the dispersion above 8 and effect the polymerization of the diamine and bis-chloroformate.

18. Process for the production of 4,4-polyurethane, which comprises forming a mixture whose aqueous solution would have an initial pH below 7 and containing tetramethylene diamine and 1,4-butanediol bis-chloroformate, and adding an alkaline material incapable of reacting with the bis-chloroformate to form a nitrogen to carbon linkage to the mixture in an amount sufficient so that its aqueous solution would have pH above 8 and effect the polymerization of the diamine and bis-chloroformate.

19. Process for the production of 4,4-polyurethane, which comprises forming a mixture whose aqueous solution would have an initial pH below 7 and containing tetramethylene diamine acid salt and 1,4-butanediol bis-chloroformate, and adding an alkaline material incapable of reacting with the bis-chloroformate to form a nitrogen to carbon linkage to the mixture in an amount sufficient so that its aqueous solution would have a pH above 8 and effect the polymerization of the diamine and bis-chloroformate.

20. Process for the production of 4,4-polyurethane, which comprises forming a mixture whose aqueous solution would have an initial pH below 7 and containing tetramethylene diamine hydrochloride and 1,4-butanediol bis-chloroformate, and adding an alkaline material incapable of reacting with the bis-chloroformate to form a nitrogen to carbon linkage to the mixture in an amount sufficient so that its aqueous solution would have pH above 8 and effect the polymerization of the diamine and bis-chloroformate.

21. Process for the production of 4,4-polyurethane, which comprises forming a dispersion having an initial pH below 7 and containing 1,4-butanediol bis-chloroformate in an aqueous solution of 1,4-tetramethylene diamine, and adding an alkaline material incapable of reacting with the bis-chloroformate to form a nitrogen to carbon linkage to the dispersion in an amount sufficient to raise the pH of the dispersion above 8 and effect the polymerization of the diamine and bis-chloroformate.

22. Process for the production of 4,4-polyurethane, which comprises forming a dispersion having an initial pH below 7 and containing 1,4-butanediol bis-chloroformate in an aqueous solution of 1,4-tetramethylene diamine acid salt, and adding an alkaline material incapable of reacting with the bis-chloroformate to form a nitrogen to carbon linkage to the dispersion in an amount sufficient to raise the pH of the dispersion above 8 and effect the polymerization of the diamine and bis-chloroformate.

23. Process for the production of 4,4-polyurethane, which comprises forming a dispersion having an initial pH below 7 and containing an aqueous solution of tetramethylene diamine and a solution of 1,4-butanediol bis-chloroformate in an organic solvent, and adding an alkaline material incapable of reacting with the bis-chloroformate to form a nitrogen to carbon linkage to the dispersion in an amount sufficient to raise the pH of the dispersion above 8 and effect the polymerization of the diamine and bis-chloroformate.

24. Process for the production of 4,4-polyurethane, which comprises forming a dispersion having an initial pH below 7 and containing an aqueous solution of tetramethylene diamine and a solution of 1,4-butanediol bis-chloroformate in an organic solvent, and adding an alkali metal hydroxide to the dispersion to raise the pH of the dispersion above 8 and effect the polymerization of the diamine and bis-chloroformate.

25. Process for the production of 4,4-polyurethane, which comprises forming a dispersion having an initial pH below 7 and containing an aqueous solution of tetramethylene diamine hydrochloride and a solution of 1,4-butanediol bis-chloroformate in an organic solvent, and adding an alkaline material incapable of reacting with the bis-chloroformate to form a nitrogen to carbon linkage to the dispersion in an amount sufficient to raise the pH of the dispersion above 8 and effect the polymerization of the diamine and bis-chloroformate.

26. Process for the production of 4,4-polyurethane, which comprises forming a dispersion of an aqueous solution of tetramethylene diamine hydrochloride and a solution of 1,4-butanediol bis-chloroformate in toluene, and adding sodium hydroxide to the dispersion to effect the polymerization of the diamine and bis-chloroformate.

27. Process for the production of 4,4-polyurethane, which comprises forming a dispersion of an aqueous solution containing 0.1 to 5.0 mols per liter of 1,4-tetramethylene diamine hydrochloride and a solution containing 0.1 to 5.0 mols per liter of 1,4-butanediol bis-chloroformate in toluene with the aid of a dispersing agent, and adding an aqueous solution of sodium hydroxide to the dispersion at a temperature of $-2$ to $5°$ C. to effect the polymerization of the diamine and bis-chloroformate.

28. Process for the production of 4,4-polyurethane, which comprises forming a dispersion of an aqueous solution containing 0.1 to 1.0 mols per liter of 1,4-tetramethylene diamine hydrochloride and a solution containing 0.1 to 1.0 mols per liter of 1,4-butanediol bis-chloroformate in toluene with the aid of a dispersing agent, said dispersion containing 0.1 to 5.0 volumes of toluene for each volume of water, and adding an aqueous solution of sodium hydroxide to the dispersion at a temperature of $-2$ to $5°$ C. to effect the polymerization of the diamine and bis-chloroformate.

29. Process for the production of 4,4-polyurethane, which comprises adding about 52 parts by weight of tetramethylene diamine to about 1750 parts by weight of water, bringing the aqueous solution to the Congo red end point by the addition of concentrated hydrochloric acid thereto, cooling the solution to 0 to 5° C., adding thereto with agitation a solution of about 129 parts by weight of 1,4-butanediol bis-chloroformate in about 1075 parts by weight of toluene, then adding a solution of 15 parts by weight of a 27% by weight aqueous solution of N-butyl-N-lauroyl-$\beta$-amino-ethane sodium sulfonate in 50 parts by weight of water and dispersing the resulting reaction mixture by continued stirring, and adding a solution of about 96 parts by weight of sodium hydroxide in 650 parts by weight of water to the dispersion to effect the polymerization of the diamine and bis-chloroformate.

WILFORD DONALD JONES.
SAMUEL B. McFARLANE.

References Cited in the file of this patent

UNITED STATES PATENTS

| Number | Name | Date |
|---|---|---|
| 2,163,636 | Spanagel | June 27, 1939 |
| 2,309,729 | Gordon | Feb. 2, 1943 |

FOREIGN PATENTS

| Number | Country | Date |
|---|---|---|
| 892,361 | France | Jan. 7, 1944 |
| 895,395 | France | Apr. 3, 1944 |
| 961,754 | France | Nov. 28, 1949 |
| 615,884 | Great Britain | Jan. 13, 1949 |
| 69,210 | Norway | Apr. 30, 1945 |

OTHER REFERENCES

Bennett Concise Chemical Technical Dictionary, Chemical Publishing Co., 1947, page 12.